US009096187B2

(12) United States Patent
Kawano et al.

(10) Patent No.: US 9,096,187 B2
(45) Date of Patent: Aug. 4, 2015

(54) FRAME MOLDING OF DOOR FOR VEHICLE

(71) Applicant: AISIN SEIKI KABUSHIKI KAISHA, Kariya-shi, Aichi-ken (JP)

(72) Inventors: Masanori Kawano, Kariya (JP); Kazuya Tsuchida, Anjo (JP); Shunji Mori, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/221,665

(22) Filed: Mar. 21, 2014

(65) Prior Publication Data
US 2014/0284952 A1 Sep. 25, 2014

(30) Foreign Application Priority Data

Mar. 25, 2013 (JP) ................................ 2013-062005

(51) Int. Cl.
*B60R 13/04* (2006.01)
*B60R 13/02* (2006.01)

(52) U.S. Cl.
CPC ................ *B60R 13/04* (2013.01); *B60R 13/02* (2013.01); *B60R 13/0206* (2013.01); *B60R 13/0243* (2013.01)

(58) Field of Classification Search
CPC .... B60R 13/04; B60R 13/02; B60R 13/0243; B60R 13/0206
USPC ......................................... 52/716.5; 296/1.08
See application file for complete search history.

(56) References Cited

U.S. PATENT DOCUMENTS

| | | | | |
|---|---|---|---|---|
| 3,591,996 | A | * | 7/1971 | Shanok et al. ............. 52/717.05 |
| 4,765,036 | A | * | 8/1988 | Iguchi et al. ..................... 24/289 |
| 6,409,256 | B1 | * | 6/2002 | Page ........................ 296/203.03 |
| 8,033,587 | B2 | | 10/2011 | Yanai |
| 8,137,230 | B2 | | 3/2012 | Omura et al. |
| 8,205,923 | B2 | * | 6/2012 | Mourou ....................... 296/1.08 |
| 8,226,143 | B2 | | 7/2012 | Takeuchi et al. |
| 8,408,622 | B2 | | 4/2013 | Yanai et al. |
| 8,776,475 | B2 | * | 7/2014 | Williamson et al. ......... 52/716.5 |
| 8,793,934 | B2 | * | 8/2014 | Sato et al. ....................... 49/377 |
| 8,904,735 | B2 | * | 12/2014 | Grandgirard et al. ...... 52/745.15 |
| 2002/0096912 | A1 | * | 7/2002 | Page ............................. 296/189 |
| 2005/0189782 | A1 | * | 9/2005 | Fujita et al. ................ 296/146.9 |

(Continued)

FOREIGN PATENT DOCUMENTS

| | | | |
|---|---|---|---|
| FR | 2577483 | A1 * | 8/1986 |
| JP | 2009-132240 | | 6/2009 |
| JP | 2012-96720 | | 5/2012 |

*Primary Examiner* — Rodney Mintz
(74) *Attorney, Agent, or Firm* — Finnegan, Henderson, Farabow, Garrett & Dunner, LLP

(57) ABSTRACT

A frame molding configured to be assembled on a corner portion of a window opening formed at an intersecting portion between a door panel and a door frame of a door for a vehicle, the frame molding includes a body member including a first molding portion formed to be extended along a first portion provided at the corner portion and a second molding portion formed to be extended along a second portion provided at the corner portion, the first portion being positioned in a vicinity of the door panel and the second portion being positioned in a vicinity of the door frame, and a support member formed along the first portion and configured to be fixed to the door panel, the support member on which the first molding portion is assembled and which includes a positioning portion determining a position of the body member relative to the door panel.

5 Claims, 6 Drawing Sheets

(56) References Cited

U.S. PATENT DOCUMENTS

| | | | |
|---|---|---|---|
| 2006/0272425 A1* | 12/2006 | Maeda et al. | 73/842 |
| 2007/0278827 A1* | 12/2007 | Nakao et al. | 296/191 |
| 2011/0163563 A1* | 7/2011 | Yanai | 296/1.08 |
| 2011/0187141 A1* | 8/2011 | Yanai et al. | 296/1.08 |
| 2012/0261933 A1* | 10/2012 | Sato et al. | 296/1.08 |
| 2013/0031865 A1* | 2/2013 | Besedich et al. | 52/716.7 |
| 2014/0292012 A1* | 10/2014 | Yoshida et al. | 296/1.08 |
| 2014/0373475 A1* | 12/2014 | Muskovac et al. | 52/468 |
| 2015/0028621 A1* | 1/2015 | Hazawa et al. | 296/146.8 |

* cited by examiner

FRAME MOLDING OF DOOR FOR VEHICLE

CROSS REFERENCE TO RELATED APPLICATIONS

This application is based on and claims priority under 35 U.S.C. §119 to Japanese Patent Application 2013-062005, filed on Mar. 25, 2013, the entire content of which is incorporated herein by reference.

TECHNICAL FIELD

This disclosure generally relates to a frame molding of a door for a vehicle.

BACKGROUND DISCUSSION

A vehicle door basically includes a door panel that opens and closes an opening portion formed at a vehicle body and a door frame assembled on an upper portion of the door panel. A window opening is formed between the door panel and the door frame. JP2009-132240A discloses a frame molding assembled on a corner portion of a window opening, i.e., on an intersecting portion between a door panel and a door frame. The frame molding is arranged to extend from an end portion in the vicinity of the door frame at an upper edge of the door panel towards the door frame and is formed to be curved upwardly along the door frame. The frame molding is fixed to the door frame by a rivet. In addition, a belt-line molding is assembled on a lower edge portion of the window opening, i.e., on the upper edge of the door panel. One end portion of the belt-line molding is connected to an end portion of the frame molding. For example, as disclosed in JP2012-96720A, a frame molding is connected to a belt-line molding via a connection member. The frame molding is attached to the connection member by means of a double-sided adhesive tape.

The door frame is basically welded to the door panel. Thus, in a case where a positional reference for mounting the frame molding is provided at the door frame, a positional accuracy of the frame molding relative to the door panel is influenced by accuracy of assembly position of the door frame relative to the door panel. On the other hand, the belt-line molding is mounted to the door panel. That is, a positional reference for mounting the frame molding is provided at the door frame while a positional reference for mounting the belt-line molding is provided at the door panel. Therefore, in a case where the accuracy of assembly position of the door frame relative to the door panel is low, a step or a clearance may be formed at a boundary portion between the frame molding and the belt-line molding, which may lead to an inferior appearance.

A need thus exists for a frame molding of a door for a vehicle which is not susceptible to the drawback mentioned above.

SUMMARY

According to an aspect of this disclosure, a frame molding configured to be assembled on a corner portion of a window opening formed at an intersecting portion between a door pan& and a door frame of a door for a vehicle, the window opening being formed between the door panel that opens and closes an opening portion formed at the vehicle body and the door frame that is assembled on an upper end portion of the door panel, the frame molding includes a body member including a first molding portion formed to be extended along a first portion provided at an inner peripheral edge portion of the corner portion and a second molding portion formed to be extended along a second portion provided at the inner peripheral edge portion of the corner portion, the first portion being positioned in a vicinity of the door panel and the second portion being positioned in a vicinity of the door frame, the first molding portion and the second molding portion being integrally formed with each other, and a support member formed to be extended along the first portion of the inner peripheral edge of the corner portion and configured to be fixed to the door panel, the support member on which the first molding portion is assembled and which includes a positioning portion determining a position of the body member relative to the door panel.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
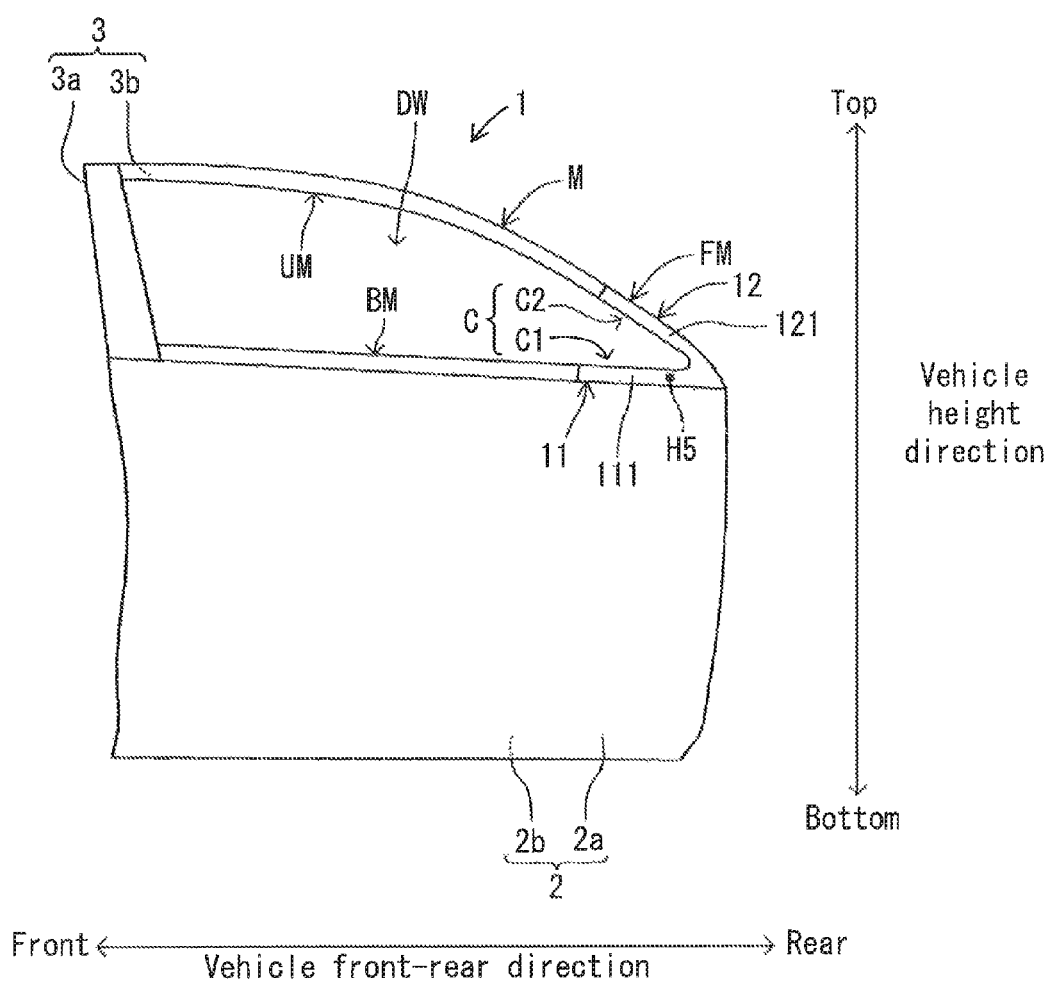
FIG. 1 is a side view of a door for a vehicle to which a frame molding of an embodiment is applied.

A frame molding FM according to an embodiment will be explained with reference to the attached drawings. First, a configuration of a door for a vehicle which will be hereinafter referred to as a vehicle door 1 on which the frame molding FM is assembled, will be briefly explained. As illustrated in FIG. 1, the vehicle door 1 includes a door panel 2 opening and closing an entrance portion (i.e., an opening portion) for an occupant seated in a left-rear seat of a vehicle and a door frame 3 assembled on the door panel 2. The frame molding FM is not limited to the door for the left-rear seat and is applicable to any doors of the vehicle.

The door panel 2 is assembled on a vehicle body via a hinge. The door panel 2 includes an outer panel 2a arranged at an outer side of a vehicle interior corresponding to an outer side in a width direction of the vehicle (i.e., in a width direction of the vehicle door 1), and an inner panel 2b arranged at an inner side of the vehicle interior corresponding to an inner side in the width direction of the vehicle (i.e., in the width direction of the vehicle door 1). The outer panel 2a and the inner panel 2b are joined to each other while opening upward, thereby forming an envelope form. The door frame 3 is assembled on an upper end portion of the door panel 2. The door frame 3 includes an upright portion 3a extending upward from a front end portion of the door panel 2 and a curve portion 3b obliquely extending forward and upward from a rear end Portion of the door panel 2. A lower end portion of the upright portion 3a is inserted in between the outer panel 2a and the inner panel 2b to be welded to the front end portion of the door panel 2, for example, to the front end portion of the inner panel 2b. An upper end portion of the upright portion 3a is connected to a front end portion of the curve portion 3b. A rear end portion (a lower end portion) of the curve portion 3b is inserted in between the outer panel 2a and the inner panel 2b to be welded to the rear end portion of the door panel 2, i.e., to the rear end portion of the inner panel 2b.

A window opening (a door window) DW is formed between the door panel 2 and the door frame 3. A door glass is accommodated within the door panel 2. The door glass is driven to move upward and downward by a lifting apparatus so that the window opening DW is opened and closed. A door window molding M is assembled on the door panel 2 and the door frame 3 to achieve an improved appearance of a peripheral edge portion of the window opening DW. The door window molding M includes an upper molding UM, a belt-line molding BM, and the frame molding FM. The upper molding UM and the belt-line molding BM include known configurations.

Figure 2:
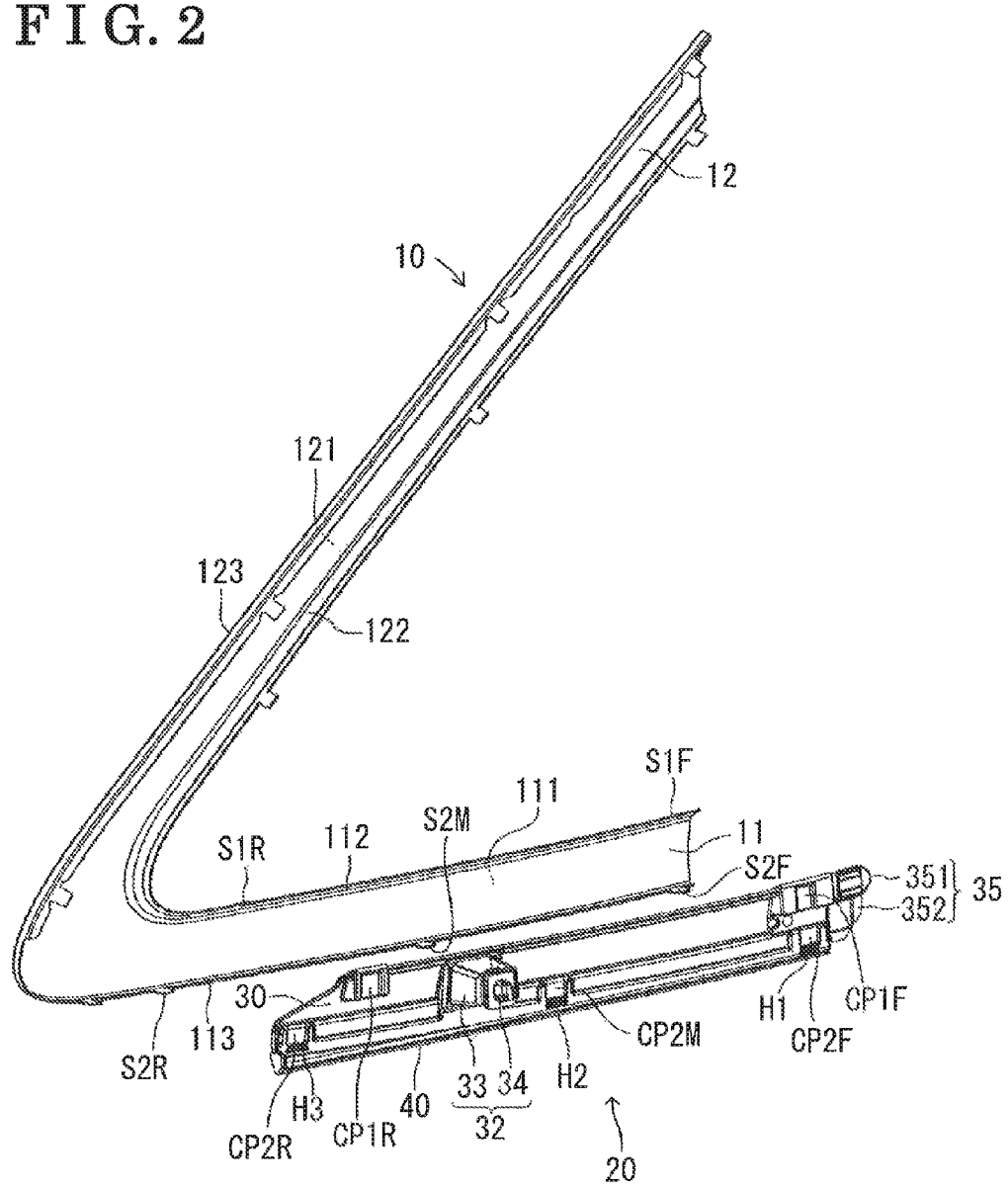
FIG. 2 is an exploded perspective view of the frame molding.
Figure 3:
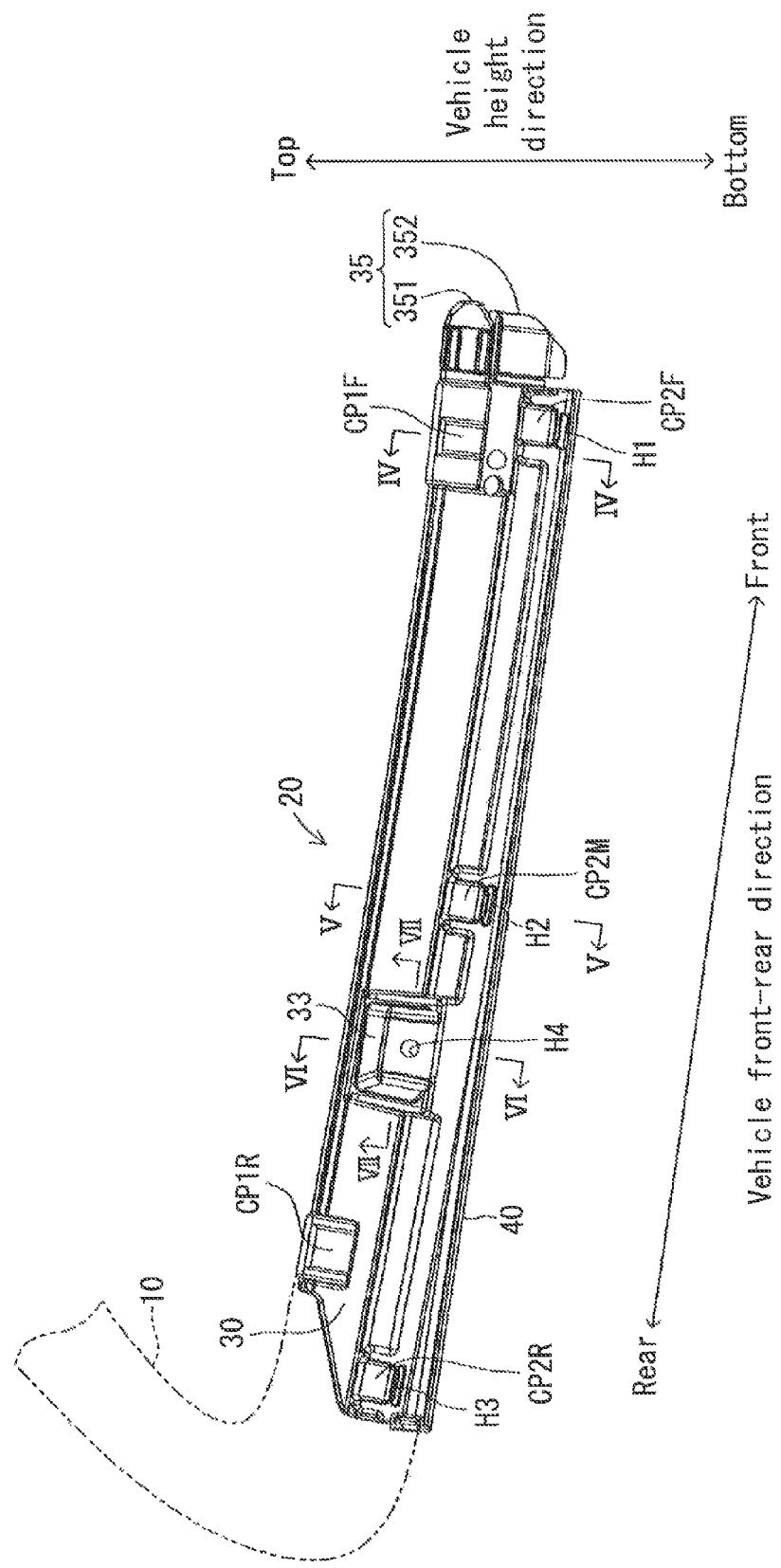
FIG. 3 is an enlarged view of a portion of a support member provided at the frame molding when viewed from an inside of a vehicle interior.

The frame molding FM is assembled on an inner peripheral edge portion of a corner portion C of the window opening DW formed at an intersecting portion between the door panel 2 and the curve portion 3b of the door frame 3. As illustrated in FIG. 2, the frame molding FM includes a body member 10. The body member 10 is assembled on a support member 20. In the following explanation, directions and orientations correspond to those of the vehicle in a state where the vehicle door 1 is closed.

The body member 10 is formed by press working of metallic plate, for example, of stainless steel plate. The body member 10 includes a first molding portion 11 and a second molding portion 12. The first molding portion 11 is formed to extend rearward from a substantially intermediate portion at a rear side relative to a center portion of the upper end portion of the door panel 2 in a front-rear direction. The second molding portion 12 is formed to extend upward and forward along the door frame 3 from a rear end of the first molding portion 11. Specifically, the first molding portion 11 is formed to extend along a first portion C1 provided at the inner peripheral edge portion of the corner portion C, the first portion C1 being positioned in the vicinity of the door panel 2. The second molding portion 12 is formed to extend along a second portion C2 provided at the inner peripheral edge portion of the corner portion C, the second portion C2 being positioned in the vicinity of the door frame 3. The first molding portion 11 and the second molding portion 12 are integrally formed with each other. The body member 10 is formed to bend along the corner portion C when viewed from the outside of the vehicle interior or the inside of the vehicle interior. The first molding portion 11 includes a first side surface portion 111 serving as a surface portion visible from the outside of the vehicle interior. End portions of the first side surface portion 111 opposing in a width direction thereof (i.e., in a short-length direction thereof) are formed to bend towards the inside of the vehicle interior to form first and second bending portions 112 and 113. Specifically, the first bending portion 112 is formed by bending the end portion of the first side surface portion 111 at an inner peripheral side, i.e., at an upper side, when viewed from the outside of the vehicle interior. The second bending portion 113 is formed by bending the end portion of the first side surface portion 111 at an outer peripheral side, i.e., at a lower side, when viewed from the outside of the vehicle interior. The second molding portion 12 includes a second side surface portion 121 serving as a surface portion visible from the outside of the vehicle interior. End portions of the second side surface portion 121 in a width direction thereof (i.e., in a short-length direction thereof) are formed to bend towards the inside of the vehicle interior to form third and fourth bending portions 122 and 123. Specifically, the third bending portion 122 is formed by bending the end portion of the second side surface portion 121 at an inner peripheral side when viewed from the outside of the vehicle interior. The fourth bending portion 123 is formed by bending the end portion of the second side surface portion 121 at an outer peripheral side when viewed from the outside of the vehicle interior.

Figure 4:
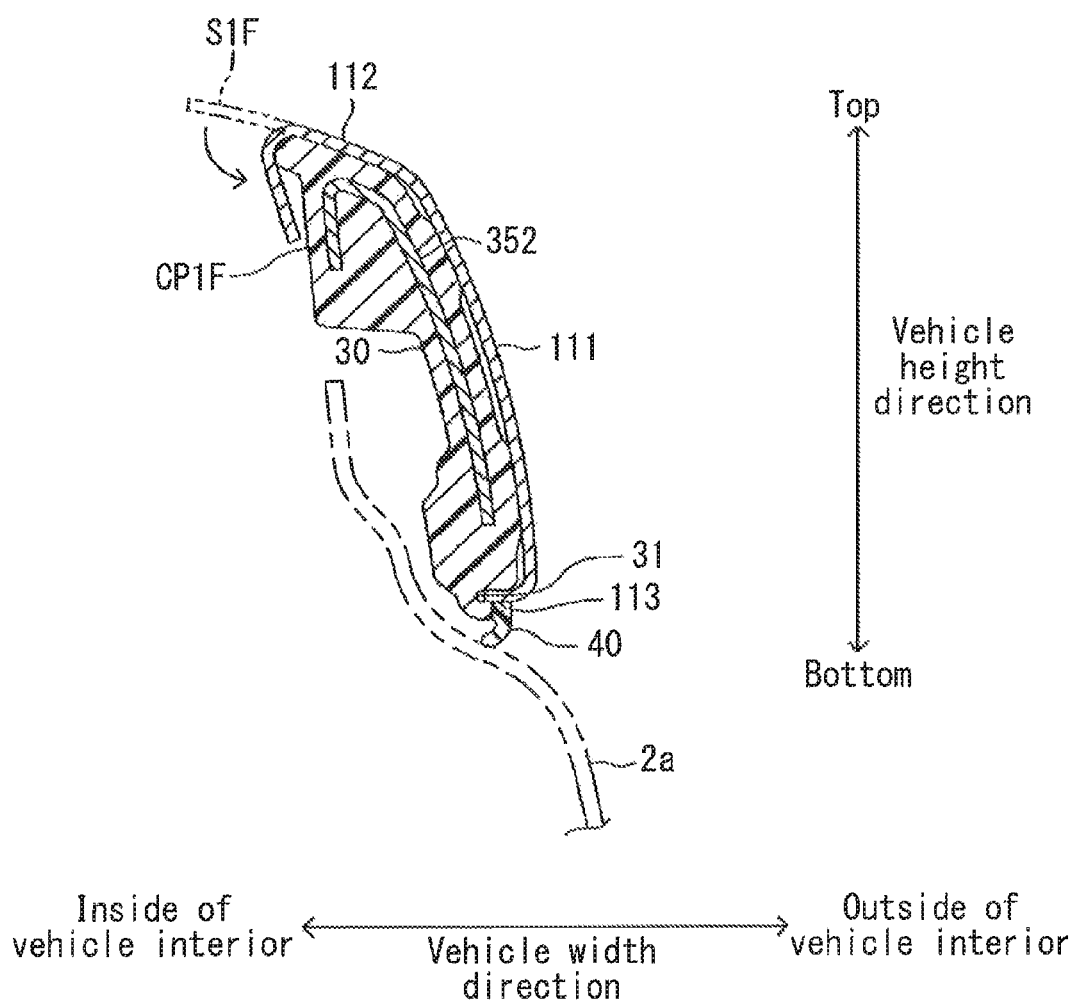
FIG. 4 is a cross-sectional view taken along line IV-IV in FIG. 3.
Figure 5:
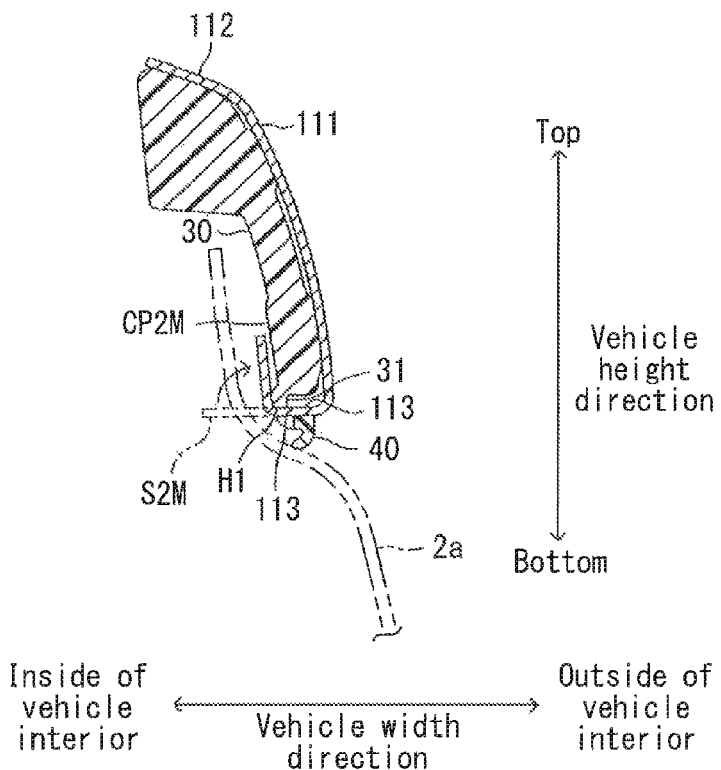
FIG. 5 is a cross-sectional view taken along line V-V in FIG. 3.

Rivet portions S1F and S1R are formed at a front end portion and a rear end portion, respectively, of the first bending portion 112. In addition, rivet portions S2F, S2M, and S2R are formed at a front end portion, an intermediate portion, and a rear end portion, respectively, of the second bending portion 113. That is, the rivet portions S1F and S1R are formed at one of the end portions of the first molding portion 11 opposing in the short-length direction thereof and the rivet portions S2F, S2M, and S2R are formed at the other of the and portions of the first molding portion 11 opposing in the short-length direction thereof. The short-length direction of the first molding portion 11 corresponds to a direction orthogonal to an extending direction of the first molding portion 11, i.e., corresponds to a width direction of the first molding portion 11. As illustrated in FIGS. 2 and 4, the rivet portions S1F and S1R are formed to project from an end surface of the first bending portion 112 towards the inside of the vehicle interior, i.e., inwardly in a width direction of the door panel 2. As illustrated in FIGS. 2 and 5, the rivet portions S2F, S2M and S2R are formed to project from an end surface of the second bending portion 113 towards the inside of the vehicle interior i.e., inwardly in the width direction of the door panel 2.

The support member 20 is formed to extend rearward from a substantially intermediate portion at the rear side relative to the center portion of the upper end portion of the door panel 2 in the front-rear direction. The support member 20 includes a base portion 30 and a lip portion 40, The first molding portion 11 of the frame molding FM is assembled on an outer side surface of the base portion 30 serving as a side surface thereof facing the outside of the vehicle interior. A groove portion 31 (see FIGS. 4 and 5) that extends in the front-rear direction is formed at a lower end portion of the outer side surface of the base portion 30. Penetration bores H1, H2, and H3 are formed at the groove portion 31 by penetrating through an inner side surface of the base portion 30 serving as a side surface thereof facing the inside of the vehicle interior. That is, the penetration bores H1, H2, and H3 penetrate from the outer side surface to the inner side surface of the base portion 30 in the width direction of the door panel 2. The penetration bores H1, H2, and H3 are arranged to face the rivet portions S2F, S2M, and S2R in a state where the first molding portion 11 is assembled on the support member 20. Recess portions CP2F, CP2M, and CP2R are positioned above the penetration bores H1, H2, and H3, respectively, at the inner side surface of the base portion 30. Recess portions CP1F and CP1R are formed at an upper end portion of the inner side surface of the base portion 30 so as to face the rivet portions S1F and S1R in a state where the first molding portion 11 is assembled on the support member 20.

Figure 6:
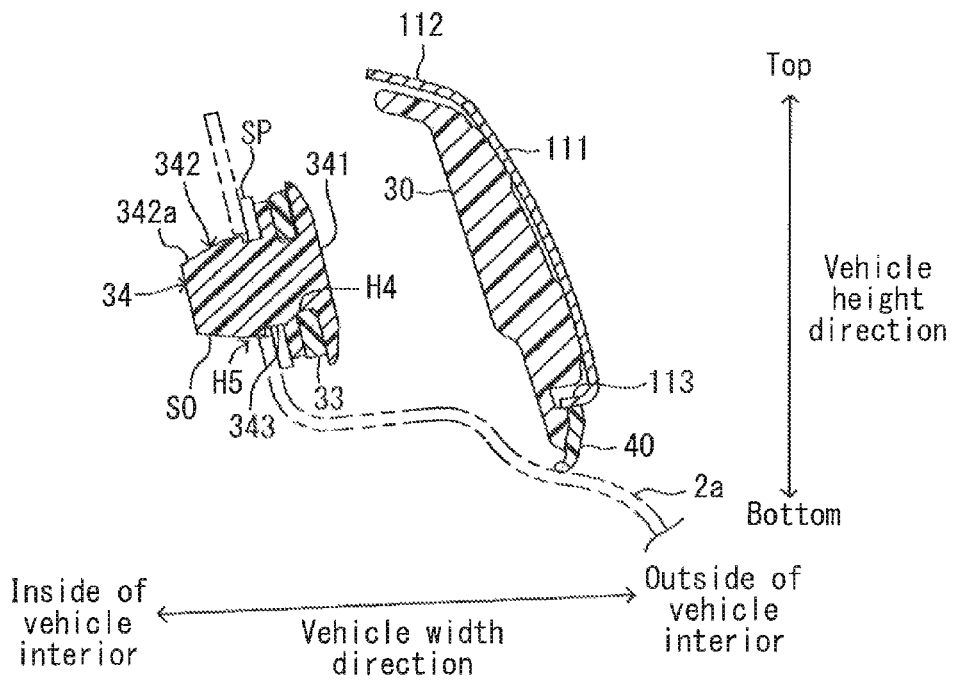
FIG. 6 is a cross-sectional view taken along line VI-VI in FIG. 3.
Figure 7:
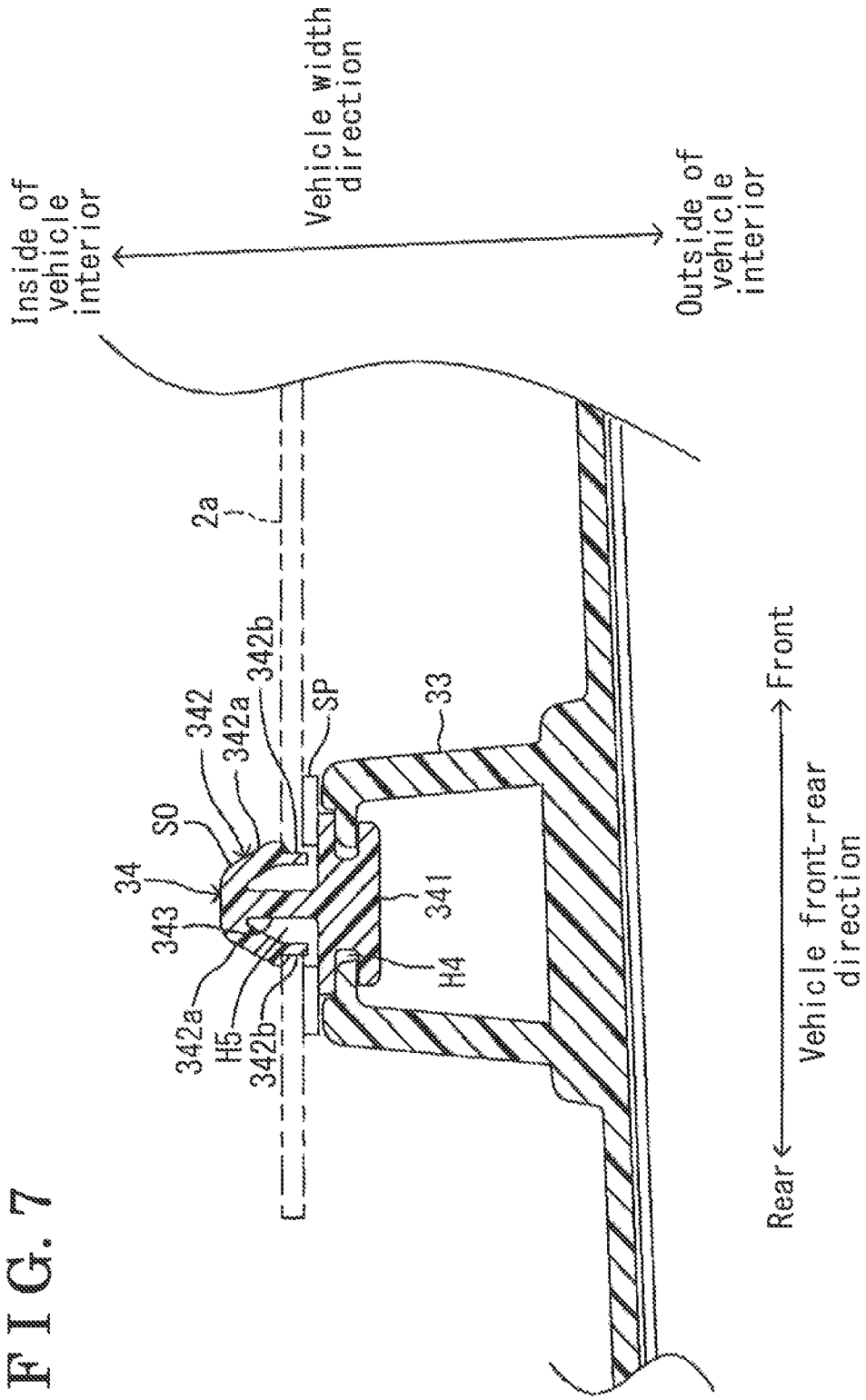
FIG. 7 is a cross-sectional view taken along line VII-VII in FIG. 3.

A fixed portion 32 serving as a positioning portion for determining a position of the body member 10 of the frame molding FM relative to the door panel 2 is formed at the base portion 30. The fixed portion 32 is formed at a position so that a length from the fixed portion 32 to a front end of the first molding portion 11 is equal to a sum of a length of the second molding portion 12 in a longitudinal direction thereof and a length from the fixed portion 32 to a rear end of the first molding portion 11 in a state where the body member 10 is assembled on the support member 20. That is, the fixed portion 32 is arranged at a rear end side relative to a center portion of the base portion 30 in the front-rear direction. The fixed portion 32 includes a seat portion 33 formed to extend from the outer side surface to the inner side surface of the base portion 30 and a snap 34 assembled on an inner side surface of the seat portion 33 facing the inside of the vehicle interior. The snap 34 serves as a fitting portion. In FIG. 2, a detailed illustration of the snap 34 is omitted. As illustrated in FIGS. 6 and 7, the snap 34 includes a leg portion 341 and a snap body portion 342. A bore H4 is formed at the inner side surface of the seat portion 33 so that the leg portion 341 of the snap 34 is fitted and inserted to the bore H4. As a result, the snap 34 is fixed to the seat portion 33. The snap body portion 342 is connected to the leg portion 341 via a shaft portion 343. In a state where the leg portion 341 is fitted and inserted to the bore H4, the snap body portion 342 projects from the inner side surface of the seat portion 33 towards the inside of the vehicle interior. The snap body portion 342 includes a pair of check pieces 342a, 342a formed to extend and expand from an end portion of the shaft portion 343 at the inner side of the vehicle interior towards the outer side of the vehicle interior. An outer peripheral surface SO obtained by the check pieces 342a, 342a is formed in a conical surface. Engagement portions 342b, 342b are formed at respective end portions of the check pieces 342a, 342a at the outer side of the vehicle interior. Specifically, the engagement portions 342b, 342b are formed to project towards the outer side of the vehicle interior from end portions at respective end surfaces of the check pieces 342a, 342a facing the shaft portion 343. A spacer SP is fitted to the snap body portion 342.

A belt-line molding support portion 35 is formed at a front end portion of the base portion 30 so as to support a rear end portion of the belt-line molding BM. The belt-line molding support portion 35 includes an upper support portion 351 supporting an upper portion of the rear end portion of the belt-line molding BM and a lower support portion 352 supporting a lower portion of the rear end portion of the belt-line molding BM. The upper support portion 351 is formed to extend forward from the front end portion of the base portion 30. The upper support portion 351 is integrally formed with the base portion 30 in a state to be made of a resin material same as a resin material forming the base portion 30. The lower support portion 352 is formed by a metallic piece that is formed by press-working of metallic plate, for example, stainless steel plate, and is assembled on the front end portion of the base portion 30 by insert-molding.

The lip portion 40 is formed at a lower edge of the base portion 30. The lip portion 40 is made of a resin material that is softer than the resin material forming the base portion 30. The base portion 30 and the lip portion 40 are integrally formed by two-color molding method in which two different materials are molded. A lower end portion of the lip portion 40 is curved to extend towards the inside of the vehicle interior.

Procedures for assembling the body member 10 of the frame molding FM on the support member 20 will be explained below. First, the rivet portions S2F, S2M, and S2R of the body member 10 are inserted into the penetration bores H1, H2, and H3, respectively, so that an inner side surface of the first molding portion 11 facing the inside of the vehicle interior is brought to make contact with the outer side surface of the base portion 30. In the aforementioned state, the second bending portion 113 engages with the groove portion 31. Then, the rivet portions S1F and S2R are bent downwardly in an arrow direction in FIG. 4, while the rivet portions S2F, S2M, and S2R are bent upwardly in an arrow direction in FIG. 5. As a result, the rivet portions S1F and S1R are received by the recess portions CP1F and CP1R, respectively, while the rivet portions S2F, S2M, and S2R are received by the recess portions CP2F, CP2M, and CP2R, respectively. Accordingly, the body member 10 of the frame molding FM is fixed to the support member 20. In the aforementioned state, the lip portion 40 is positioned at a lower side of the body member 10, i.e., of the first molding portion 11. That is, the lip portion 40 is arranged to extend along a lower surface of the second bending portion 113.

Next, procedures for assembling the door window molding M on the peripheral edge portion of the window opening DW will be explained. First, a rear end portion of the upper molding UM is welded via a connection member to an upper end portion of the second molding portion 12 of the body member 10. Next, the frame molding FM and the upper molding UM are assembled on the outer panel 2a and the curve portion 3b in a way as explained below. As illustrated in FIGS. 1, 6, and 7, a penetration bore H5 is formed at an upper rear end portion of the outer panel 2a so as to penetrate through the outer panel 2a from an outer side surface to an inner side surface thereof in the width direction. An end portion of the snap body portion 342 is inserted into the penetration bore H5 from the outside of the vehicle interior. When the frame molding FM is further pushed towards the inside of the vehicle interior, the end portions of the check pieces 342a, 342a at the outer side of the vehicle interior are elastically deformed to come closer to the shaft portion 343 so that the check pieces 342a, 342a move into the door panel 2. When the check pieces 342a, 342a move to be positioned within the door panel 2, the elastic deformation of each of the check pieces 342a, 342a is released so that the engagement portions 342b, 342b make contact with the inner side surface of the outer panel 2a. At this time, an inner side surface of the space SP is in contact with the outer side surface of the outer panel 2a while an outer side surface of the space SP is in contact with the outer side surface of the seat portion 33. Accordingly, the frame molding FM is fixed to the inner peripheral edge portion of the corner portion C. A length of the shaft portion 343 in a vehicle height direction is substantially the same as an inner diameter of the penetration bore H5. That is, the penetration bore H5 serves as a reference bore for an assembly position of the frame molding FM.

Next, the second molding portion 12 and the upper molding UM are fixed to the curve portion 3b. The second molding portion 12 and the upper molding UM include engagement pieces at respective inner side surfaces facing the inside of the vehicle interior, each of the engagement pieces projecting towards the inside of the vehicle interior to be fixed to the curve portion 3b via a screw or a rivet, for example. Accordingly, the frame molding FM and the upper molding UM are mounted to the outer panel 2a and the curve portion 3b. In a state where the frame molding FM and the upper molding UM are mounted to the outer panel 2a and the curve portion 3b, the lip portion 40 is exposed to the outside of the first molding portion 11 when viewed from the outside of the vehicle interior. That is, in a case where the frame molding FM mounted to the corner portion C is viewed from the outside of the vehicle, the lip portion 40 may be configured to be exposed to the outside of the first molding portion 11. The lower end portion of the lip portion 40 is in contact with the outer side surface of the outer panel 2a. As a result, a clearance is inhibited from being formed between a lower edge portion of the frame molding FM and the outer panel 2a to thereby improve appearance of a boundary portion between the frame molding FM and the outer panel 2a.

Then, the belt-line molding BM is assembled on the upper edge portion of the outer panel 2a. Procedures for assembling the belt-line molding BM on the outer panel 2a are the same as known procedures. That is, the belt-line molding BM is slid rearward to be placed on the upper edge portion of the outer panel 2a so that the belt-line molding support portion 35 is inserted to the rear end portion of the belt-line molding BM. A front end portion of the belt-line molding BM is fixed to the outer panel 2a by a clip, for example. Accordingly, the door window molding M is mounted to the peripheral edge portion of the window opening DW.

As mentioned above, the fixed portion 32 serving as the positioning portion for deciding or determining the position of the body member 10 relative to the door panel 2 is formed at the support member 20 supporting the first molding portion 11. The snap 34 of the fixed portion 32 is fitted to the penetration bore H5 serving as the reference bore formed at the door panel 2. Therefore, accuracy of the assembly position of the frame molding FM relative to the door panel 2 is inhibited from being influenced by accuracy of the assembly position of the door frame 3 relative to the door panel 2. A clearance or a step, for example, may be unlikely to be formed at a boundary portion between the belt-line molding BM and the frame molding FM. Appearance of the boundary portion between the belt-line molding BM and the frame molding FM may be improved. In addition, the snap 34 is simply fitted to the penetration bore H5 to cause the frame molding FM to be fixed to the door panel 2 and to determine the assembly position of the frame molding FM relative to the door panel 2. As a result, assembly performance of the frame molding FM may be improved.

Further, the body member 10 is assembled on the support member 20 via the rivet portions S1F, S1R, S2F, S2M and S2R being riveted (i.e., firmly connected or locked). Thus, an adhesive agent, for example, a double-sided adhesive tape, is not necessary as compared to a case where the body member 10 and the support member 20 are adhered to each other. Not only assembly hours are reduced but also a step or a clearance is restrained from being formed at the boundary portion between the frame molding FM and the belt-line molding BM caused by a positional error of the body member 10 relative to the support member 20 or variations in thickness of an adhesion layer, for example. In addition, the support member 20 includes the base portion 30 and the lip portion 40 integrally formed with each other. Thus, as compared to a case where the base portion 30 and the lip portion 40 are separately formed and are then adhered to each other, an adhesive agent, for example, is not necessary and an adhesion process may be reduced to thereby decrease a manufacturing cost. Because the penetration bores H1, H2, and H3 are formed at the lower end portion of the base portion 30, assembly performance in a case where the rivet portions S2F, S2M, and S2R of the first molding portion 11 are riveted (i.e., firmly connected or locked) to the base portion 30 is improved. In addition, the rivet portions S1F and S2F are provided at a rear end of the belt-line molding support portion 35 in a state to be separated from each other in an up-down direction and riveted (i.e., firmly connected or locked) to the base portion 30. Thus, strength for holding the belt-line molding support portion 35 by the first molding portion 11 may increase. The snap 34 is arranged at the rear end side relative to the center portion of the base portion 30 in the front-rear direction. That is, the snap 34 is arranged at the rear end side of the first molding portion 11. Because the snap 34 is arranged at the lower end side of the second molding portion 12, in the vicinity of the lower end of the second molding portion 12, a step or a clearance, for example, is inhibited from being formed between the frame molding FM and the upper molding UM, or between the upper molding UM and the upright portion 3a (center pillar garnish).

In a case where a connection member connecting the frame molding FM and the belt-line molding BM is provided separately from the support member 20 and the connection member is assembled on either the support member 20 or the body member 10, a step or a clearance, for example, may be formed at the boundary portion between the frame molding FM and the belt-line molding BM when accuracy of assembly between the connection member and either the support member 20 or the body member 10 is low. According to the present embodiment, because the belt-line molding support portion 35, specifically, the upper support portion 351, supporting the front end portion (i.e., one end portion) of the belt-line molding BM is integrally formed with the support member 20, the aforementioned issue caused by the assembly accuracy of the connection member may not occur.

The present embodiment is not limited to include the aforementioned configuration and may be appropriately modified or changed.

For example, in the present embodiment, the snap 34 is fitted to the penetration bore H5 so that the frame molding FM is assembled on the first portion C1 provided at the inner peripheral edge portion of the corner portion C in the vicinity of the door panel 2. Alternatively, a screw or a rivet, for example, may be used to fix the seat portion 33 to the outer panel 2a.

In the aforementioned embodiment, the fixed portion 32 includes the snap 34 configured to be fitted and fixed to the door panel 2.

In addition, the body member 10 is made of a metallic plate, the first molding portion 11 including the rivet portions S1R, S1F, S2R, S2M, and S2F formed at at least one of the end portions of the first molding portion II opposing in the short-length direction thereof, the rivet portions S1R, S1F, S2R, S2M, and S2F being formed to project towards the inside of the vehicle interior. The support member 20 is assembled on the first molding portion 11 via the rivet portions S1R, S1F, S2R, S2M, and S2F being riveted.

Further, the support member 20 includes the base portion 30 on which the first molding portion 11 is assembled, and the lip portion 40 formed of a material softer than a material of which the base portion 30 is formed, the lip portion 40 being arranged to be exposed to the outside of the first molding portion 11 and to be extended along the lower edge portion of the first molding portion 11 in a state where the first molding portion 11 is assembled on the base portion 30, the base portion 30 and the lip portion 40 being integrally formed with each other.

Furthermore, the base portion 30 includes the penetration bores H1, H2, and H3 penetrating from the outer side surface facing the outside of the vehicle interior to the inner side surface facing the inside of the vehicle interior in a state where the fixed portion 32 is fixed to the door panel 2, and the rivet portions S2R, S2M, and S2F are inserted to the penetration bores H1, H2,and H3 to be riveted.

Furthermore, the frame molding FM includes the belt-line molding support portion 35 configured to support one end portion of the belt-line molding BM formed to be extended along the lower edge portion of the window opening DW, the belt-line molding support portion 35 being integrally formed at the support member 20.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A frame molding configured to be assembled on a corner portion of a window opening formed at an intersecting portion between a door panel and a door frame of a door for a vehicle, the window opening being formed between the door panel that opens and closes an opening portion formed at the vehicle body and the door frame that is assembled on an upper end portion of the door panel, the frame molding comprising:

a body member including a first molding portion formed to be extended along a first portion of an inner peripheral edge portion of the corner portion and a second molding portion formed to be extended along a second portion of the inner peripheral edge portion of the corner portion, the first portion of the inner peripheral edge portion of the corner portion being positioned in a vicinity of the door panel and the second portion of the inner peripheral edge portion of the corner portion being positioned in a vicinity of the door frame, the first molding portion and the second molding portion being integrally formed with each other; and a support member formed to be extended along the first portion of the inner peripheral edge of the corner portion and configured to be fixed to the door panel, the support member on which the first molding portion is assembled and which includes a positioning portion determining a position of the body member relative to the door panel;

the first molding portion includes a rivet portion formed at an end portion of the fill molding portion opposing in a short-length direction thereof, the rivet portion being formed to project towards an inside of a vehicle interior, the support member including a base portion on which the first molding portion is assembled, and the base portion including, including a penetration bore penetrating from an outer side surface facing an outside of the vehicle interior to an inner side surface facing the inside of the vehicle interior in a stat where the positioning portion is fixed to the door panel, and the rivet portion is inserted to the penetration bore to be riveted by bend in vehicle height direction.

2. The frame molding according to claim 1, wherein the positioning portion includes a fitting portion configured to be fitted and fixed to the door panel.

3. The frame molding according to claim 1, wherein the body member is made of a metallic plate, and wherein the support member is assembled on the first molding portion via the rivet portion being riveted.

4. The frame molding according to claim 1, wherein the support member includes a lip portion formed of a material softer than a material of which the base portion is formed, the lip portion being arranged to be exposed to an outside of the first molding portion and to be extended along a lower edge portion of the first molding portion in a state where the first molding portion is assembled on the base portion, the base portion and the lip portion being integrally formed with each other.

5. The frame molding according to claim 1, further comprising a belt-line molding support portion configured to support one end portion of a belt-line molding formed to be extended along a lower edge portion of the window opening, the belt-line molding support portion being integrally formed at the support member.

* * * * *